(12) United States Patent
Royt

(10) Patent No.: US 9,610,886 B1
(45) Date of Patent: *Apr. 4, 2017

(54) AUTOMATIC LOCK FOR CARGO CONTAINER

(71) Applicant: Peck & Hale, L.L.C., West Sayville, NY (US)

(72) Inventor: Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,317

(22) Filed: Nov. 28, 2016

Related U.S. Application Data

(60) Division of application No. 14/692,020, filed on Apr. 21, 2015, now Pat. No. 9,505,336, which is a continuation of application No. 14/452,019, filed on Aug. 5, 2014, now Pat. No. 9,011,055.

(60) Provisional application No. 61/862,310, filed on Aug. 5, 2013.

(51) Int. Cl.
*B60P 7/08* (2006.01)
*B60P 7/13* (2006.01)
*B65D 90/00* (2006.01)

(52) U.S. Cl.
CPC .............. *B60P 7/132* (2013.01); *B65D 90/00* (2013.01)

(58) Field of Classification Search
CPC .................................. B60P 7/132; B65D 90/00
USPC ....... 410/84, 32, 80, 82, 83, 69, 91; 248/500, 248/503; 24/287; 280/406.1
See application file for complete search history.

(56) References Cited

U.S. PATENT DOCUMENTS

| | | | |
|---|---|---|---|
| 5,020,947 A | 6/1991 | Marcelius | |
| 6,974,164 B2 | 12/2005 | Brewster | |
| 7,014,234 B2 | 3/2006 | Walker | |
| 7,056,081 B2 | 6/2006 | Kelly | |
| 7,114,898 B2 | 10/2006 | Brewster | |
| 7,637,704 B2 | 12/2009 | Morin | |
| 7,883,305 B2 * | 2/2011 | Watson | B60P 7/132 410/76 |
| 8,007,214 B2 | 8/2011 | Brewster | |
| 8,177,463 B2 | 5/2012 | Walker | |
| 8,342,786 B2 | 1/2013 | Kelly | |
| 8,523,501 B2 | 9/2013 | Kelly | |
| 8,827,612 B2 | 9/2014 | Kelly | |
| 9,011,055 B1 * | 4/2015 | Royt | B60P 7/132 410/84 |
| 9,505,336 B2 * | 11/2016 | Royt | B60P 7/132 410/84 |

* cited by examiner

*Primary Examiner* — Stephen Gordon
(74) *Attorney, Agent, or Firm* — Schroeder Law PC

(57) ABSTRACT

An automatic lock affixed to a cargo container for interconnecting two stacked containers, and for automatically locking and unlocking without reliance upon the overcoming of a friction force to release the device.

10 Claims, 20 Drawing Sheets

AUTOMATIC LOCK FOR CARGO CONTAINER

This application is a division of U.S. application Ser. No. 14/692,020, filed Apr. 21, 2015, now U.S. Pat. No. 9,505,336, which is a continuation of U.S. application Ser. No. 14/452,019, filed Aug. 5, 2014, now U.S. Pat. No. 9,011,055, which claims the benefit of U.S. Provisional Application Ser. No. 61/862,310, filed Aug. 5, 2013.

BACKGROUND OF THE INVENTION

The present invention relates to the interlocking of stacked cargo containers and, more particularly, to automatic locks which are secured to and travel with the container.

The prior art includes various devices for interconnecting stacked cargo containers. These devices include manual locks, semi-automatic locks, and automatic locks. As will be recognized to those skilled in the art, manual locking devices must be manually installed within the corner fitting, are manually locked, are manually unlocked, and are then manually removed from the corner fitting. Semi-automatic devices must be manually installed in the corner fitting, provide automatic locking but must be manually unlocked, and are then manually removed from the corner fitting. Finally, automatic devices must be manually installed in the corner fitting, provide automatically locking and unlocking, and are then manually removed from the corner fitting.

Although the art has advanced from manual locks to semi-automatic locks to automatic locks, and although each new design has provided certain additional benefits, today's fully automatic locks still have certain drawbacks. First, many prior art automatic locks still require an operator to manually install and remove the device from the corner fitting of the container, resulting in additional time and cost during loading/unloading. Second, many prior art automatic devices are designed to release once a predetermined friction force is overcome during hoisting of the container. Due to such factors as tolerances, wear and abuse of the corner fittings, designs which rely upon release of friction forces can provide inconsistent results.

There is therefore a need in the art for an automatic lock which is capable of interconnecting two stacked containers, and of locking and unlocking without reliance upon the overcoming of a friction force to release the device. The same automatic lock is preferably affixed to the container, thereby eliminating the need to install and remove such device during loading/unloading of the container.

SUMMARY OF THE INVENTION

The present invention, which address the needs of the prior art, provides an automatic lock for a cargo container. The container has an upper surface and a lower surface. The lower surface defines a plane P. The container further includes at least one lower corner fitting located on the lower surface thereof. The lock includes a corner fitting mechanism sized and configured for location within an opening formed in the lower corner fitting. The mechanism includes a lower cone sized and located to releasably engage an adjacent corner fitting when the container is stacked upon another cargo container. The lock further includes a rack having first and second ends. The first end of the rack is connected to the corner fitting mechanism whereby movement of the rack actuates the corner fitting mechanism to move the lower cone between a released unengaged position and a locked engaged position. The second end of the rack extends outward from the lower corner fitting. The lock further includes a first linkage having first and second ends. The first end of the first linkage is pivotably connected to the second end of the rack. The lock further includes a foot. The second end of the first linkage is pivotably connected to the foot. The lock further includes a second linkage having first and second ends. The first end of the second linkage is pivotably connected to the foot. The second linkage is spring-loaded. The lock further includes a mounting point affixed to the lower surface of the container. The second end of the second linkage pivotably connected to the mounting point. The first and second linkages are sized and located such that the foot is suspended below plane P prior to the stacking of the cargo container on another cargo container whereby the contact of the foot with the upper surface of another cargo container causes upward movement of the foot and the resultant movement of the first linkage and of the rack thereby resulting in the actuation of the corner fitting mechanism.

As a result, the present invention provides an automatic lock which is capable of interconnecting two stacked containers, and of locking and unlocking without reliance upon the overcoming of a friction force to release the device. This same automatic lock is preferably affixed to the container, thereby eliminating the need to install and remove such device during loading/unloading of the container.

DETAILED DESCRIPTION OF THE INVENTION

Figure 1:
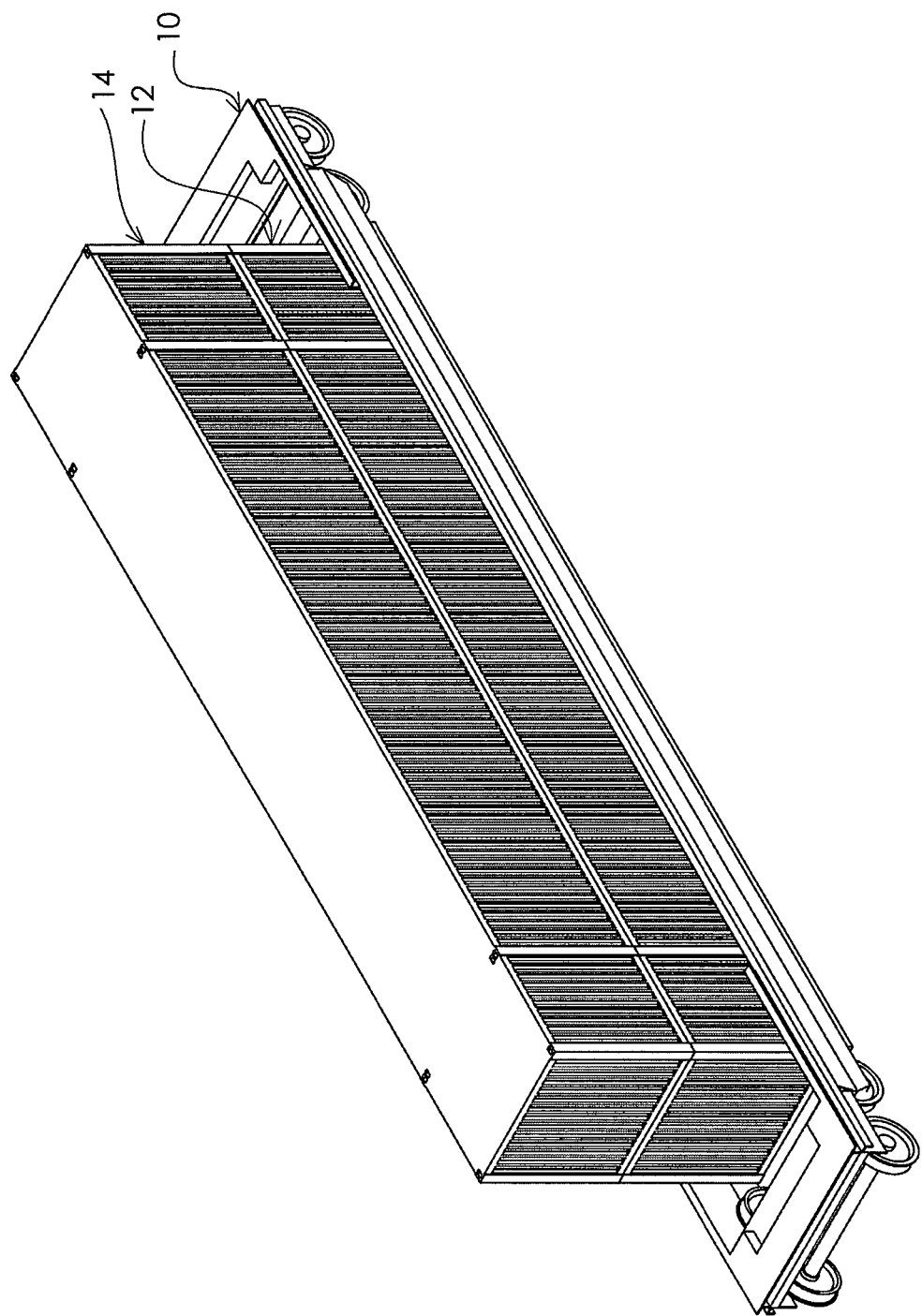
FIG. 1 is a perspective view of a typical well car having two 53' domestic cargo containers stacked thereon.

It is commonplace in the rail industry to use what are commonly referred to as well-cars (also known as double-stack cars) to transport cargo containers. A typical well-car 10 is shown in FIG. 1. A lower container 12 sits within the well of the car, while an upper container 14 rests upon lower container 12. Those skilled in the art will recognize containers 12, 14 to be 53' U.S. Domestic Containers, which is a common container used in the rail industry. These 53' containers are all made with a standard size and configuration, including the location of four corner fittings on both the upper and lower surfaces.

Figure 2:
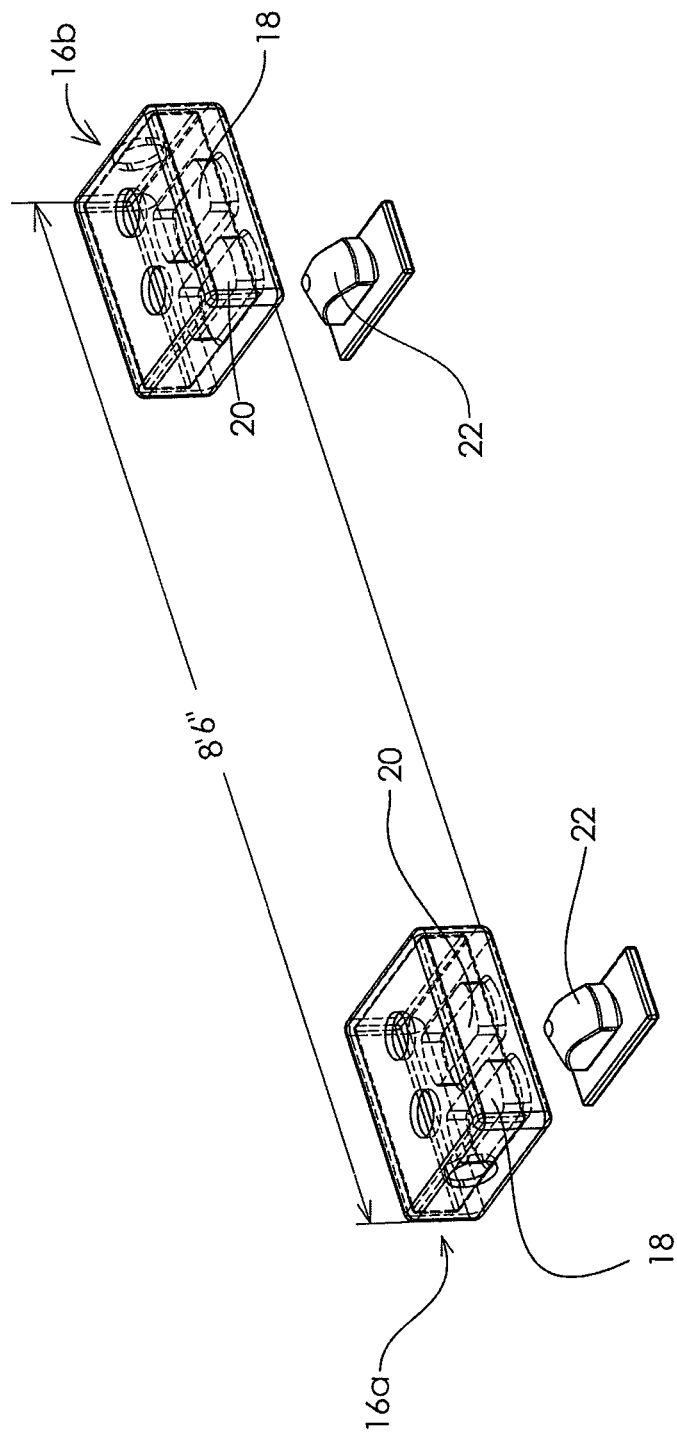
FIG. 2 is a schematical representation of the corner fittings of a domestic cargo container interacting with the retainers located on the floor of a well car.

Referring now to FIG. 2, each of containers 12, 14 is formed with a standard width of 8'-6". As best seen in FIG. 1, the corner fittings are located at the outer edges of the container, such that the distance from the outer edge of corner fitting 16a to the outer edge of corner fitting 16b is also 8'-6". Each of the corner fittings located on the lower surface of a domestic container is formed with both an outboard opening 18 and an inboard opening 20. Located at the bottom of each well-car are four retainers 22, which are sized and located to engage and penetrate the inboard openings of the four corner fittings located on the bottom surface of container 12 when container 12 is lowered into the well of car 10. The combination of retainers 22 and the walls of the well-car ensure that container 12 is secure for transport. When a second container, e.g., container 14, is to be stacked upon container 12, it is industry practice today to use a plurality of twistlocks to interconnect and lock container 14 to container 12.

Figure 3:
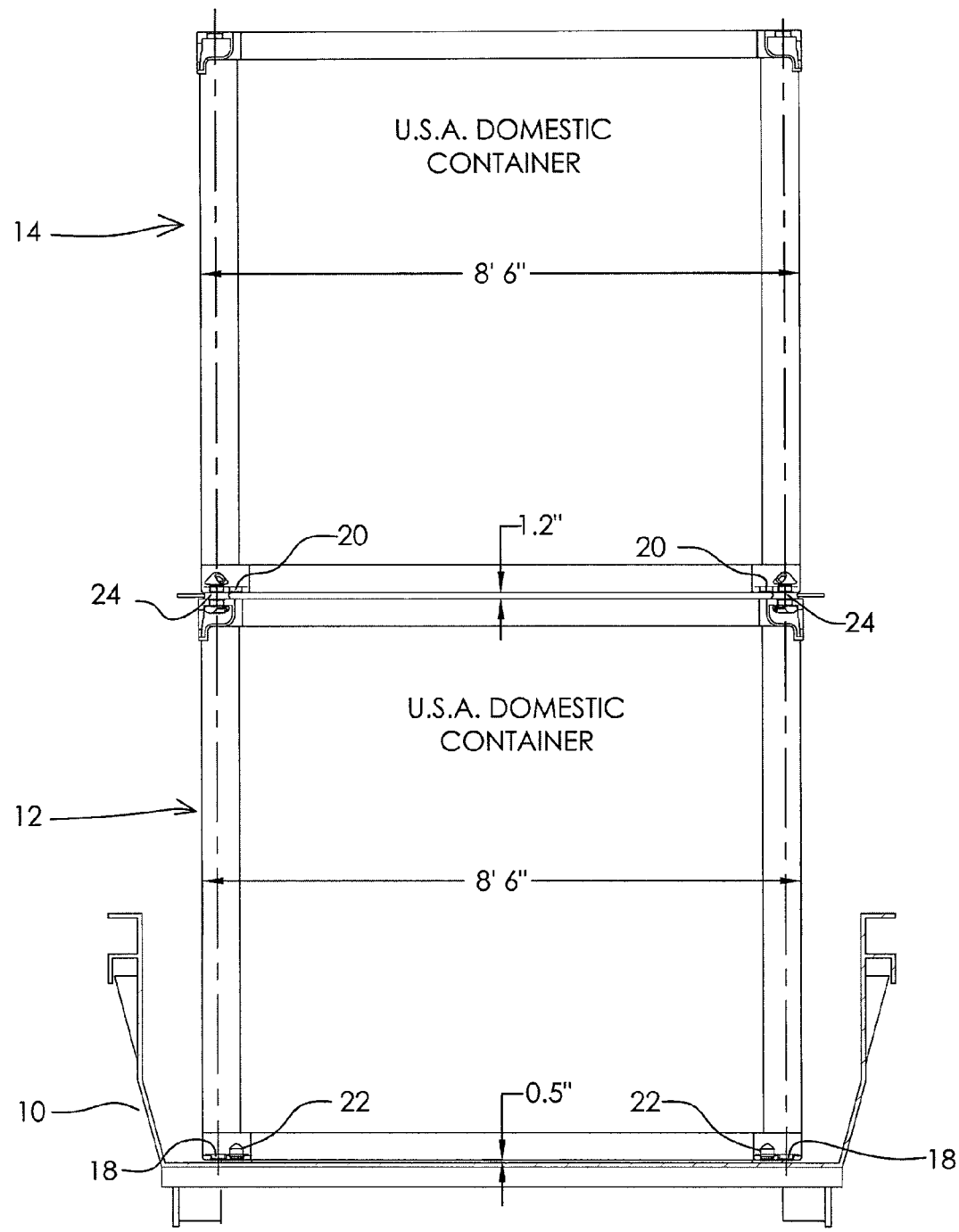
FIG. 3 is a schematical end view of a well car showing two stacked domestic cargo containers.

The stacking of two 53' domestic containers is best illustrated with reference to FIG. 3. As shown, retainers 22 affixed to the bottom of well car 10 penetrate inboard openings 20 in each of the four corner fittings located on the bottom surface of container 12. The outboard openings 18 located in these same corner fittings are not used in this application. Four twistlocks 24 are then used to interconnect and lock container 14 to container 12.

Figure 4:
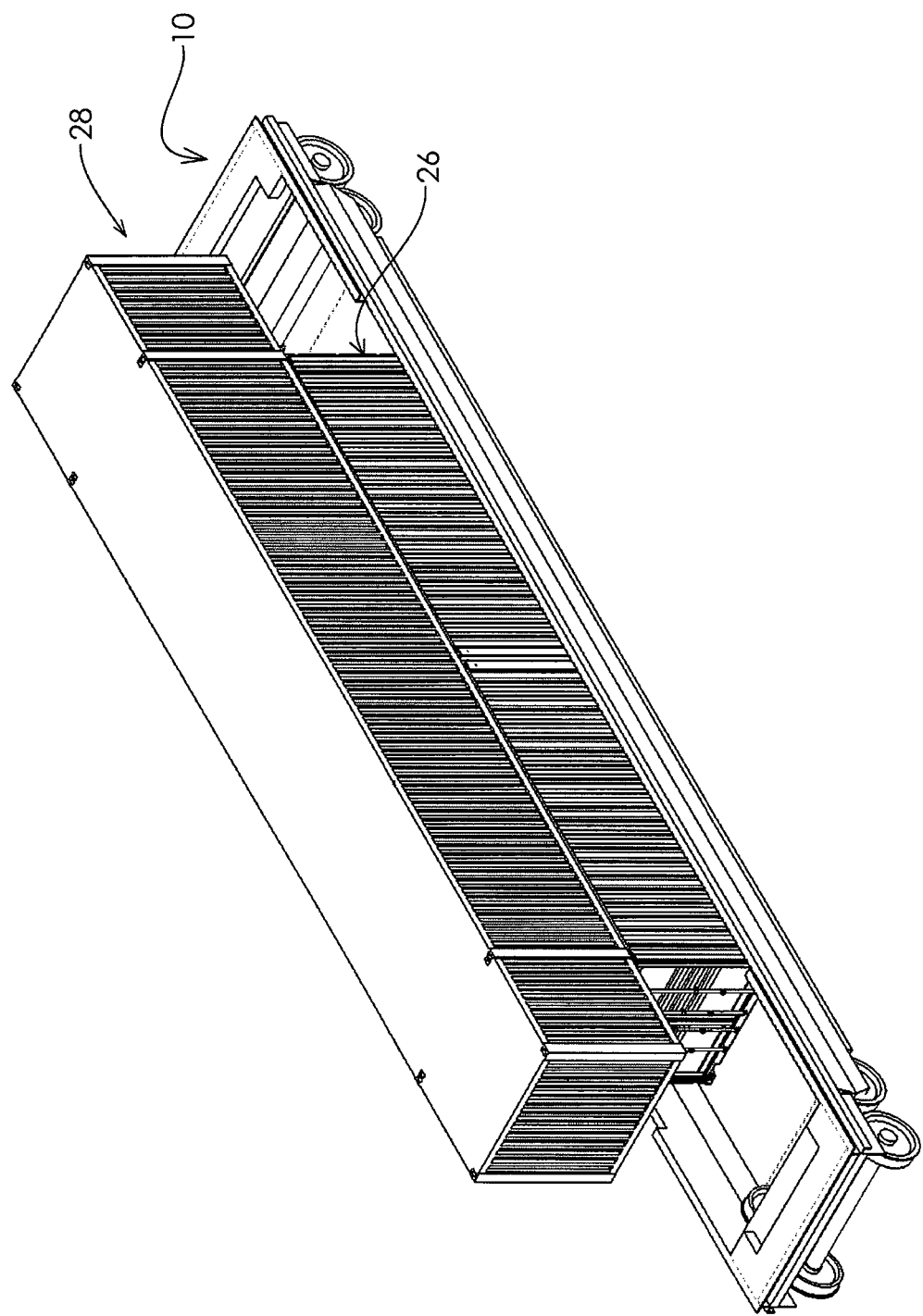
FIG. 4 is a perspective view of a typical well car having a 53' domestic cargo container stacked upon a 40' ISO cargo container.
Figure 5:
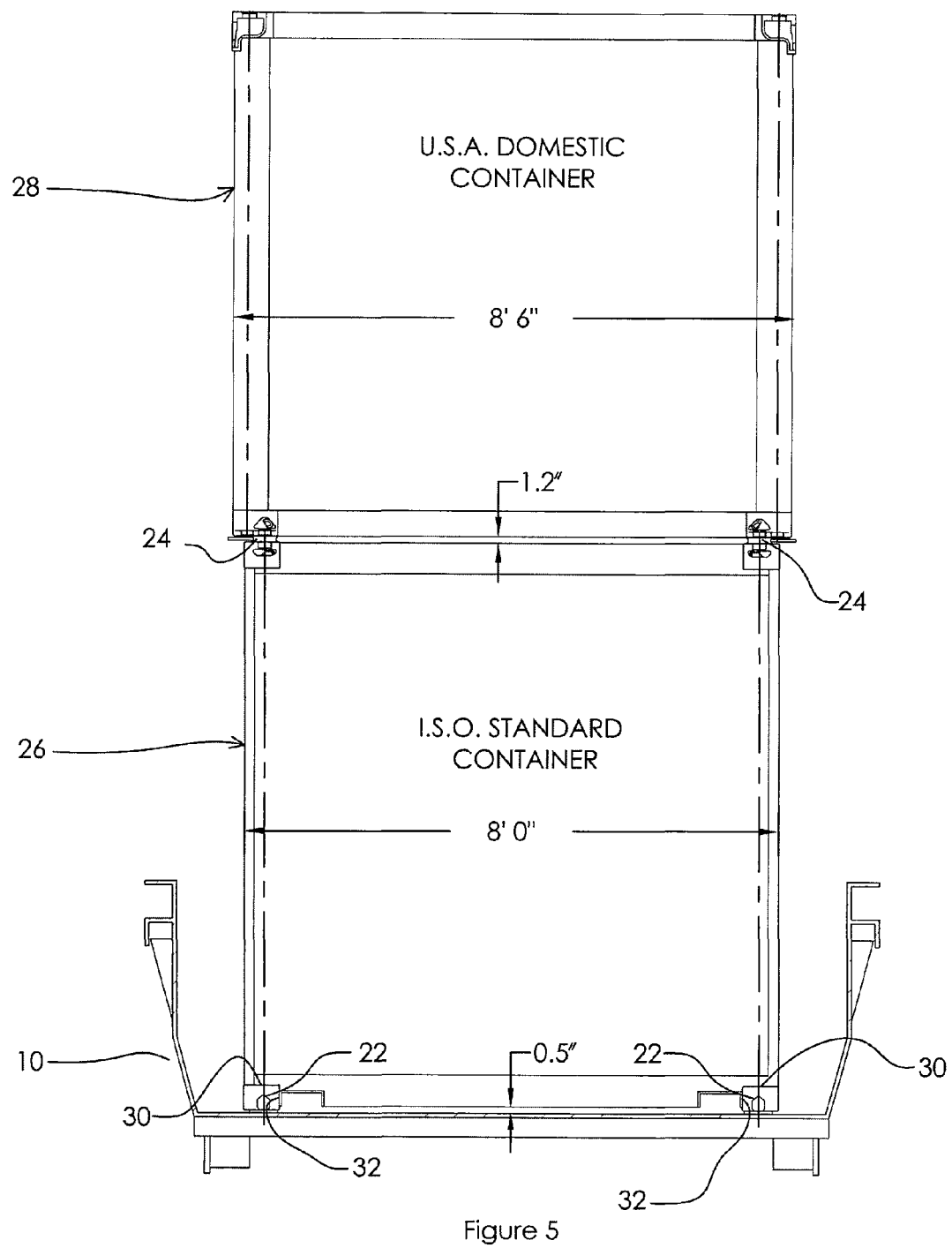
FIG. 5 is a schematical end view of a well car showing a domestic cargo container stacked upon an ISO cargo container.

The rail industry also uses 8' wide containers referred to as ISO standard containers. These ISO standard containers can be formed with lengths of 10', 20', 30', 40' and 49'. A 40' ISO container 26 is shown in FIG. 4. As shown, container 26 is positioned within the well of car 10. A 53' domestic container 28 is stacked thereon. This stacked relationship is best illustrated with reference to FIG. 5. As illustrated in FIG. 5, container 26 includes a plurality of corner fittings 30, all of which are formed with a single opening 32. Openings 32 are located to engage retainers 22 in the same manner that openings 20 of fittings 16 engaged retainers 22. A plurality of twistlocks 24 are used to interconnect and lock container 28 to container 26. Inasmuch as container 26 is narrower in profile, inboard openings 20 of corner fittings 16 receive one of the locking cones of the twistlocks. In this application, outboard openings 18 of corner fittings 16 are not used.

It has been discovered herein that the dual opening configuration of the corner fittings on the lower surface of domestic containers can be utilized in the design of an automatic lock for such containers. More particularly, the present invention provides a novel automatic locking system which can be installed on the lower surface of a domestic container, and which will cooperate with the outboard opening of each corner fitting located on such lower surface. As will be explained further hereinbelow, such an arrangement still allows the domestic container to be used in the applications described above. More particularly, the novel arrangement of the present invention will not interfere with retainers 22 of well-car 10 engaging inboard openings 20 of corner fittings 16 when the domestic container is placed within the well of car 10. In such a scenario, the novel locking arrangement of the present invention will simply remain unused. In the arrangement shown in FIG. 5, the novel locking arrangement of the present invention will also remain in unused condition without interfering with the usage of four twist locks to interconnect and lock container 28 to container 26. However, in the common application shown in FIG. 3 (wherein a domestic container is stacked upon another domestic container), the novel automatic locking arrangement of the present invention will eliminate the need for twistlocks 24, thus saving time and money during loading and unloading of the containers.

Figure 6:
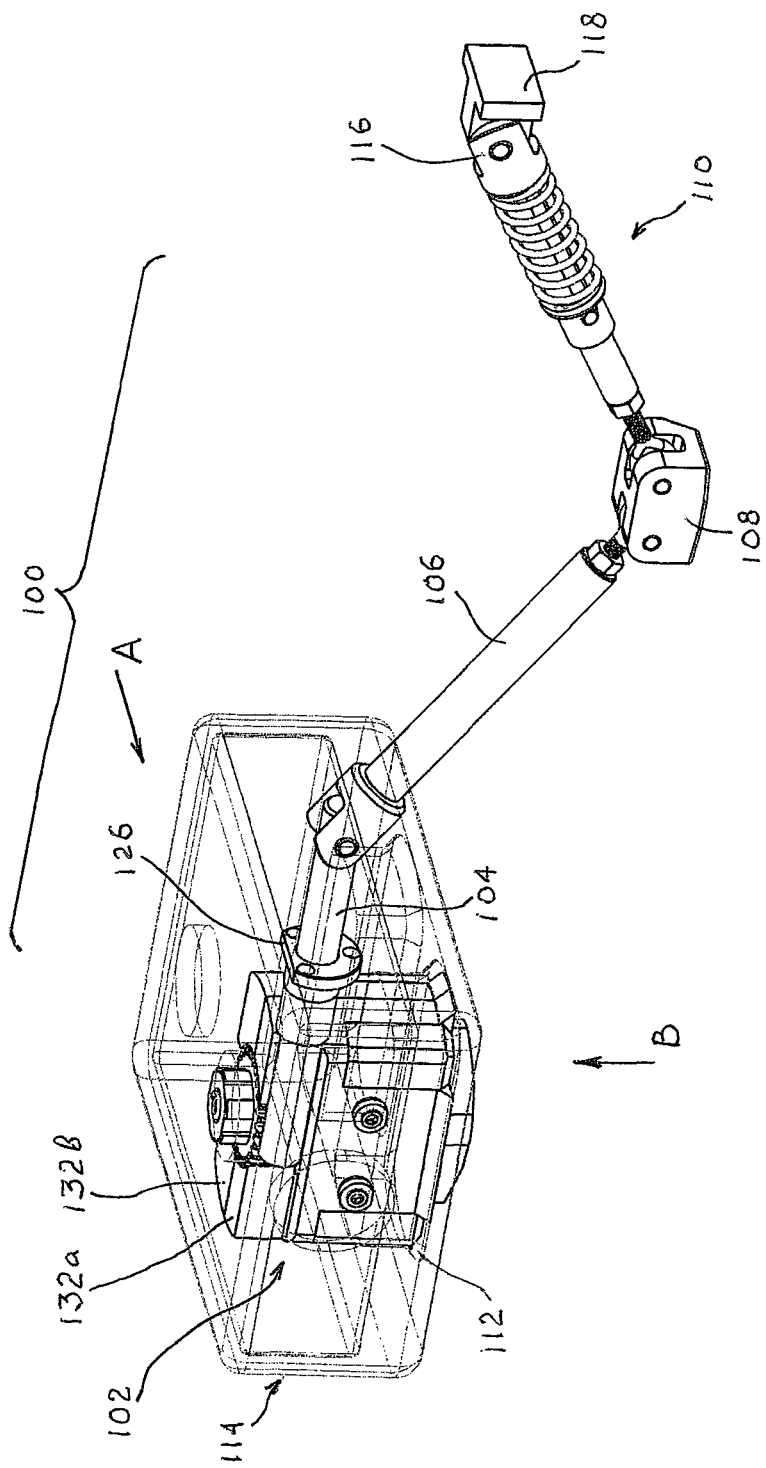
FIG. 6 is a perspective view showing the automatic lock of the present invention.
Figure 7:
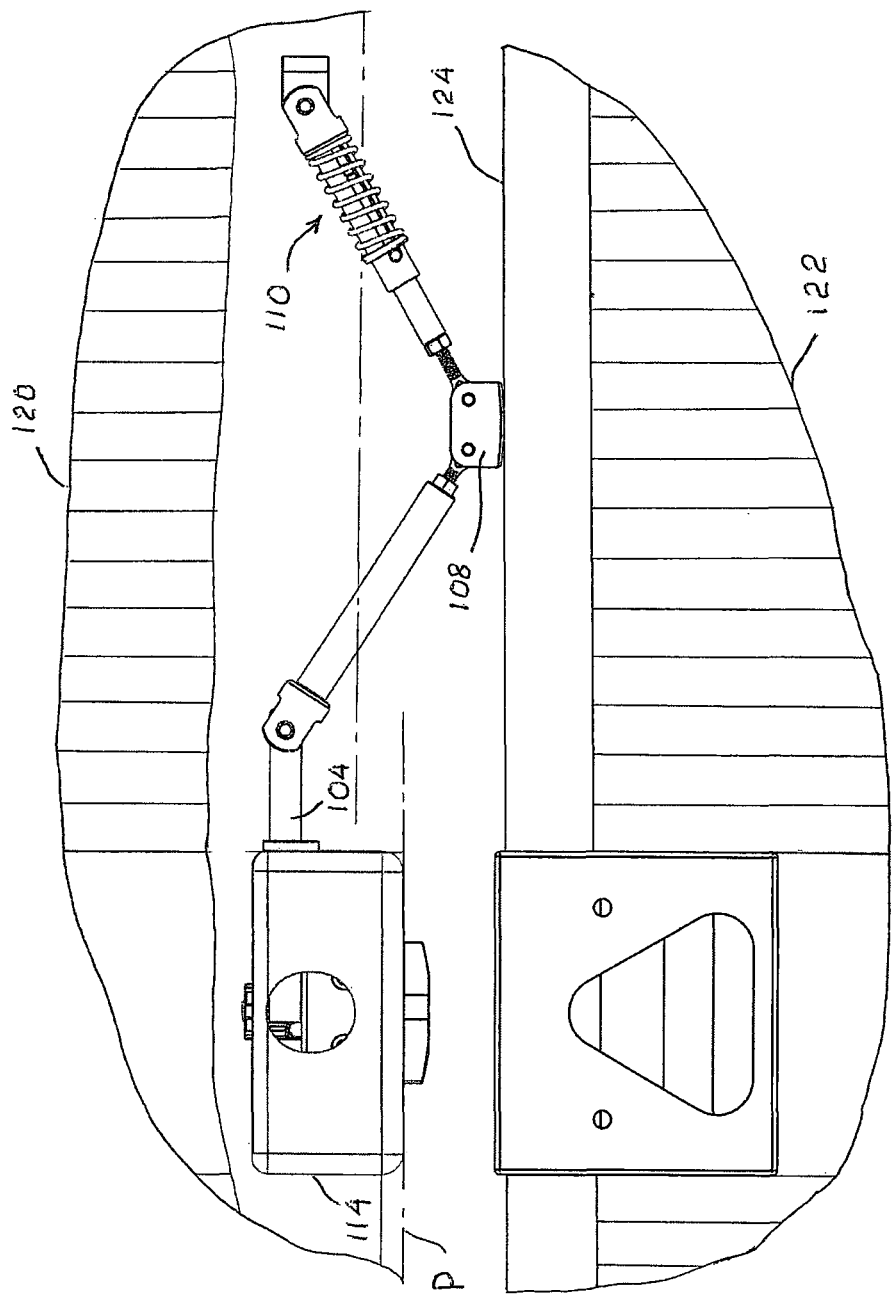
FIG. 7 is a side elevation view showing an upper domestic cargo container incorporating the automatic lock of the present invention being landed upon a lower domestic cargo container.

An automatic lock 100 formed in accordance with the present invention is shown in FIG. 6. Lock 100 includes a corner fitting mechanism 102, a rack 104, a linkage 106, a foot 108, and a spring-loaded linkage 110. As shown, mechanism 102 is located within outboard opening 112 of corner fitting 114. The other end of automatic lock 100, i.e., end 116 of linkage 110, is pivotably connected to a mounting point 118 located on the bottom of the same container including corner fitting 114. As will be more fully understood with reference to FIG. 7, mounting point 118 is located on the bottom surface of the container 120, container 120 being a domestic container. Foot 108 extends downward below the plane, i.e., plane P, defined by the bottom surface of corner fitting 114. As container 120 is lowered upon container 122 (also a domestic container), foot 108 contacts the upper surface 124 of container 122. The continued lowering of container 120 causes foot 108 to move generally upward, which in turn moves linkage 106 and linkage 110. More particularly, movement of linkage 106 causes horizontal movement of rack 104 (to the left as viewed in FIG. 7). As shown in FIG. 6, rack 104 extends through a flange 126, which restricts movement of rack 104 to a horizontal left and right translation (as viewed in FIG. 7). The generally upward movement of foot 108 also causes spring-loaded linkage 110 to compress, thereby providing a biasing force tending to urge foot 108 downward to its "at-rest" position below the surface of plane P.

Figure 8:
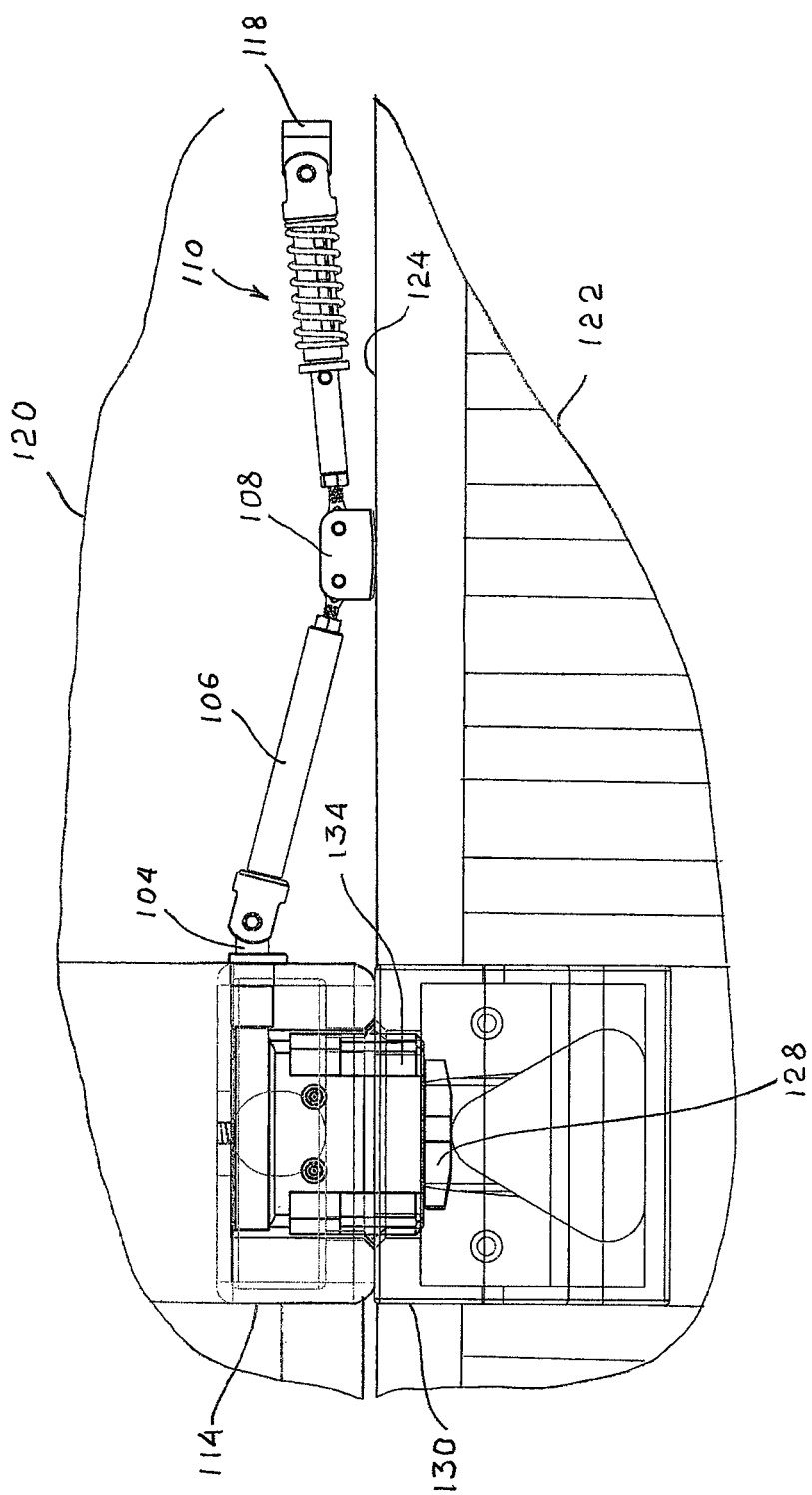
FIG. 8 is a view similar to FIG. 7 showing the upper domestic cargo container landed upon the lower domestic cargo container.

FIG. 8 shows domestic container 120 landed upon domestic container 122. Foot 108 remains in contact with upper surface 124 of lower container 122. As such, foot 108 has been moved toward the bottom surface of container 120. This movement results in the translation of rack 104 to the left, which in turn causes lower cone 128 to move into its locking position within corner fitting 130 of container 122. The movement of foot 108 also causes spring-loaded linkage 110 to compress into the biased position shown in FIG. 8. When upper container 120 is unloaded, the action is reversed—that is, spring-loaded linkage 110 moves foot 108 downward, which in turn moves linkage 106, and ultimately rack 104 to the right (as viewed in FIG. 8). It is further contemplated herein that foot 108 may be replaced with a spherical-shaped joint, which may be more resistant to inadvertent impact forces encountered during handling of the container.

Figure 9:
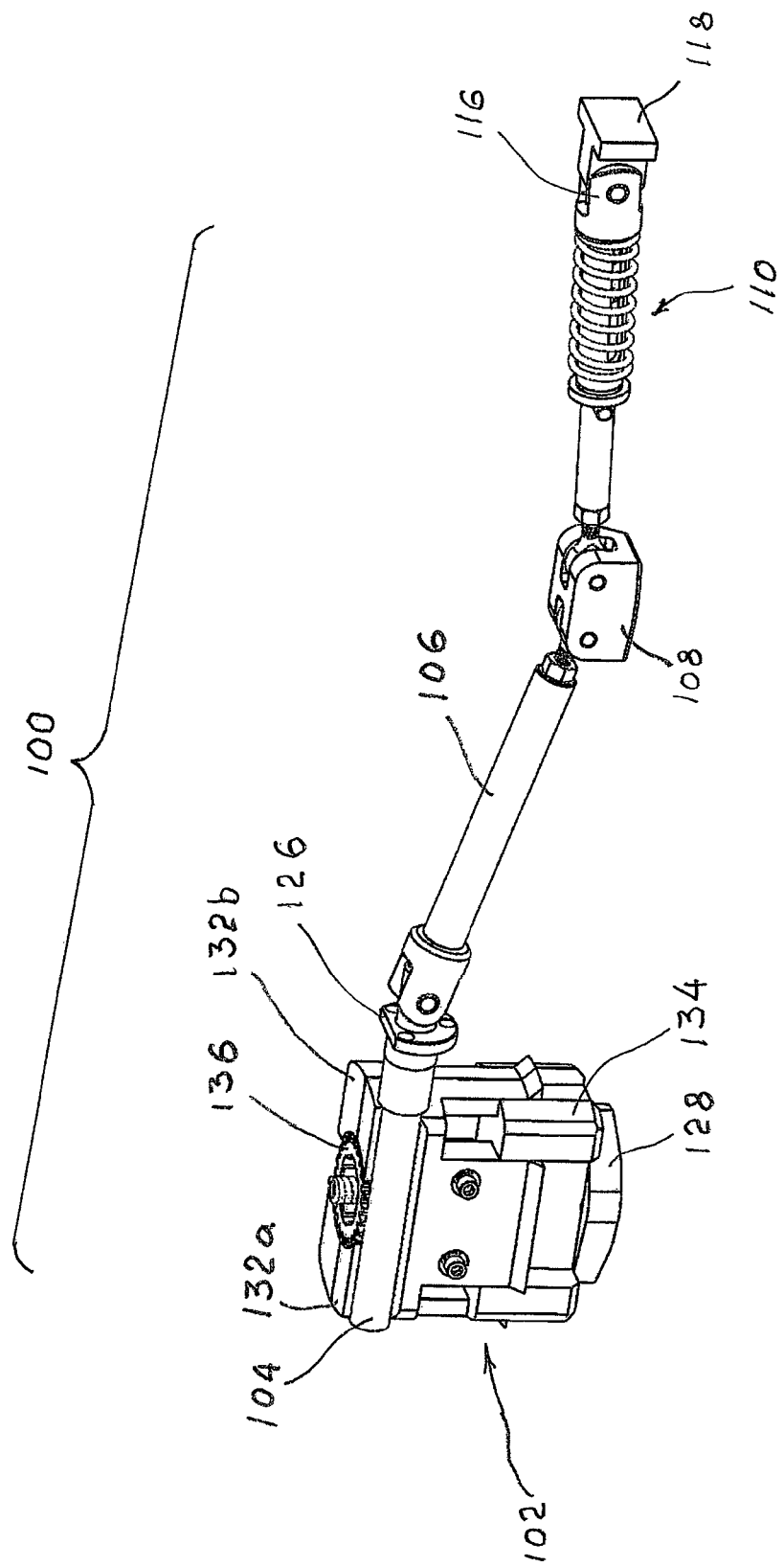
FIG. 9 is an enlarged detail of the automatic lock of FIG. 6, with the corner fitting removed for clarity.

To better illustrate the operation of mechanism 102, corner fitting 114 has been removed from FIG. 9. Like FIG. 8, FIG. 9 shows lock 100 in its locked orientation. That is, foot 108 has been moved upward, spring-loaded linkage 110 has been moved into a biased position, and rack 104 has been translated to its left-most orientation. Lower cone 128 is shown in its rotated and locked orientation. In addition to lower cone 128, corner fitting mechanism 102 includes a housing body 132, a slider 134, and a gear 136. As shown in FIG. 6, housing body 132 preferably includes a front body portion 132*a* and a rear body portion 132*b*. As will be more fully explained hereinbelow, the movement of rack 104 to the left causes rotation of gear 136, which in turn causes vertical translation downward of slider 134, as well as both vertical and rotational movements of lower cone 128. Referring back now to FIG. 8, slider 134 is shown extended downward into corner fitting 130, and lower cone 128 is rotated to engage at least a portion of corner fitting 130.

Figure 10:
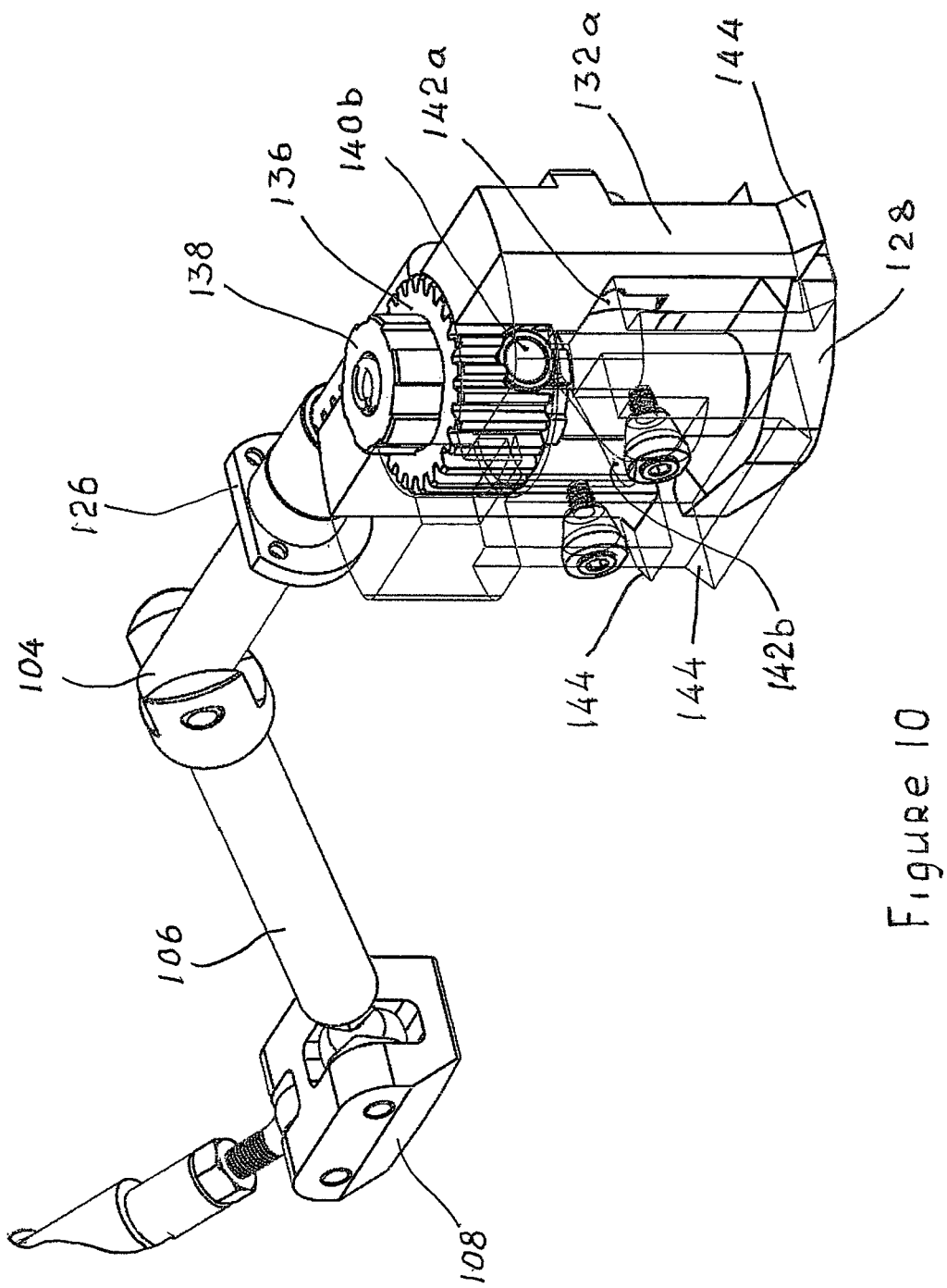
FIG. 10 is a view taken along arrow A of FIG. 6.

In FIG. 10, rear body portion 132*b* has been removed for clarity. As shown, a spline shaft 138 extends through and engages gear 136. As a result, rotation of gear 136 causes simultaneous rotation of shaft 138. Shaft 138 is preferably an integral component which extends through gear 136 into engagement with lower cone 128 such that rotation of shaft 138 causes simultaneous rotation of lower cone 128. A pair of cam followers 140*a*, 140*b* are secured to opposing sides of spline 138, and follow cam surfaces 142*a*, 142*b* formed in body portions 132*a*, 132*b*, respectively. As will be explained more fully hereinbelow, the lower edges of body portions 132*a*, 132*b* include skirts 144. Skirts 144 extend around all four sides of mechanism 102.

Figure 11:
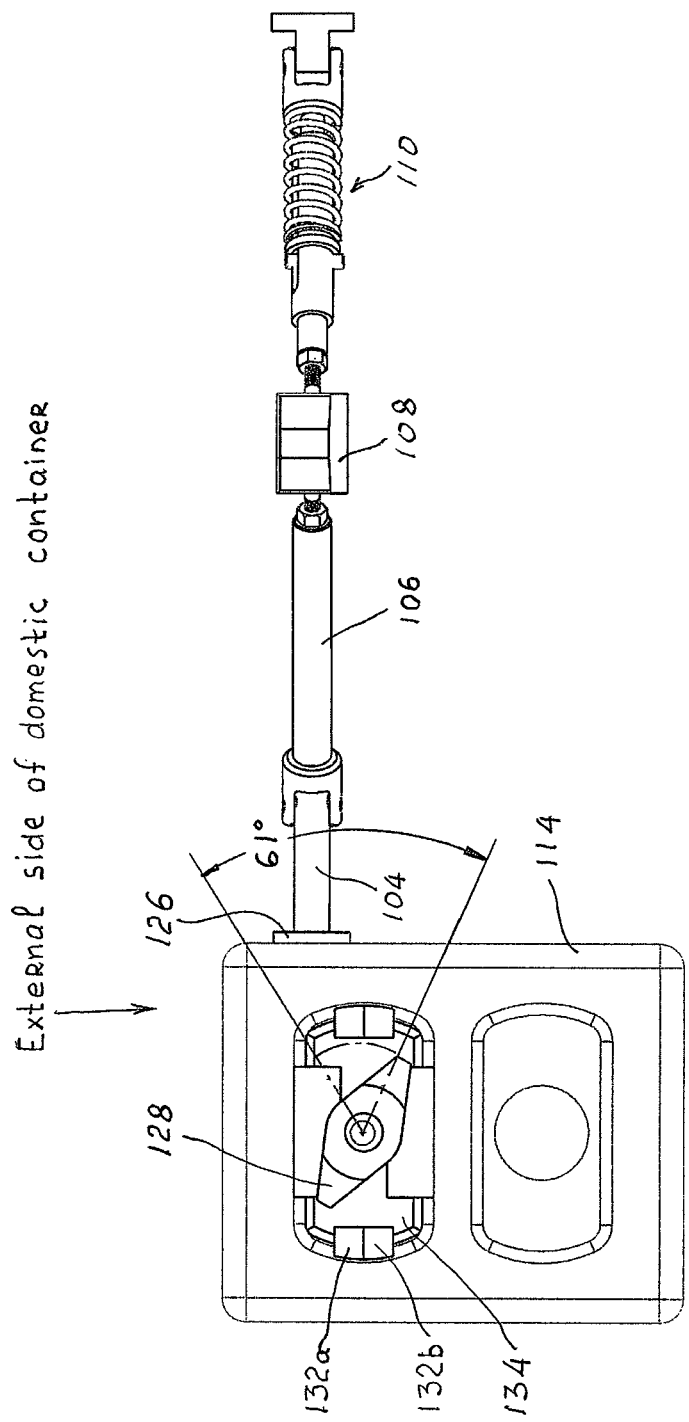
FIG. 11 is a view taken along arrow B of FIG. 6.

Referring back to FIG. 7, in one preferred embodiment mechanism 102 is configured such that lower cone 128 is located outside of corner fitting 114, even when in the "at-rest" condition. This design recognizes the limited vertical height within corner fitting 114, as well as the need to vertically displace lower cone 128 downward into engagement with the corner fitting on the container therebelow. FIG. 11 (which is a view taken along arrow B of FIG. 6) shows lower cone 128 in its "at-rest" position. This will also be the position of lower cone 128 when a container has been hoisted for loading. As mentioned hereinabove, lower cone 128 is connected to spline shaft 138. Moreover, lower cone 128 translates vertically downward together with slider 134. As a result, lower cone 128 is rotating at the same time it is being displaced downward. To ensure that lower cone 128 will be in a suitable orientation to allow passage through the opening in the corner fitting of the lower container, lower cone 128 is initially positioned in the orientation in FIG. 11. Thus, lower cone 128 can rotate through approximately 61 degrees from the initiation of translation to the point where lower cone 128 is within the corner fitting of the lower container. Once inside the corner fitting in the lower container, continued rotation of lower cone 128 will cause lower cone 128 to engage a portion of the corner fitting, thereby interconnecting the upper and lower containers.

Figure 12:
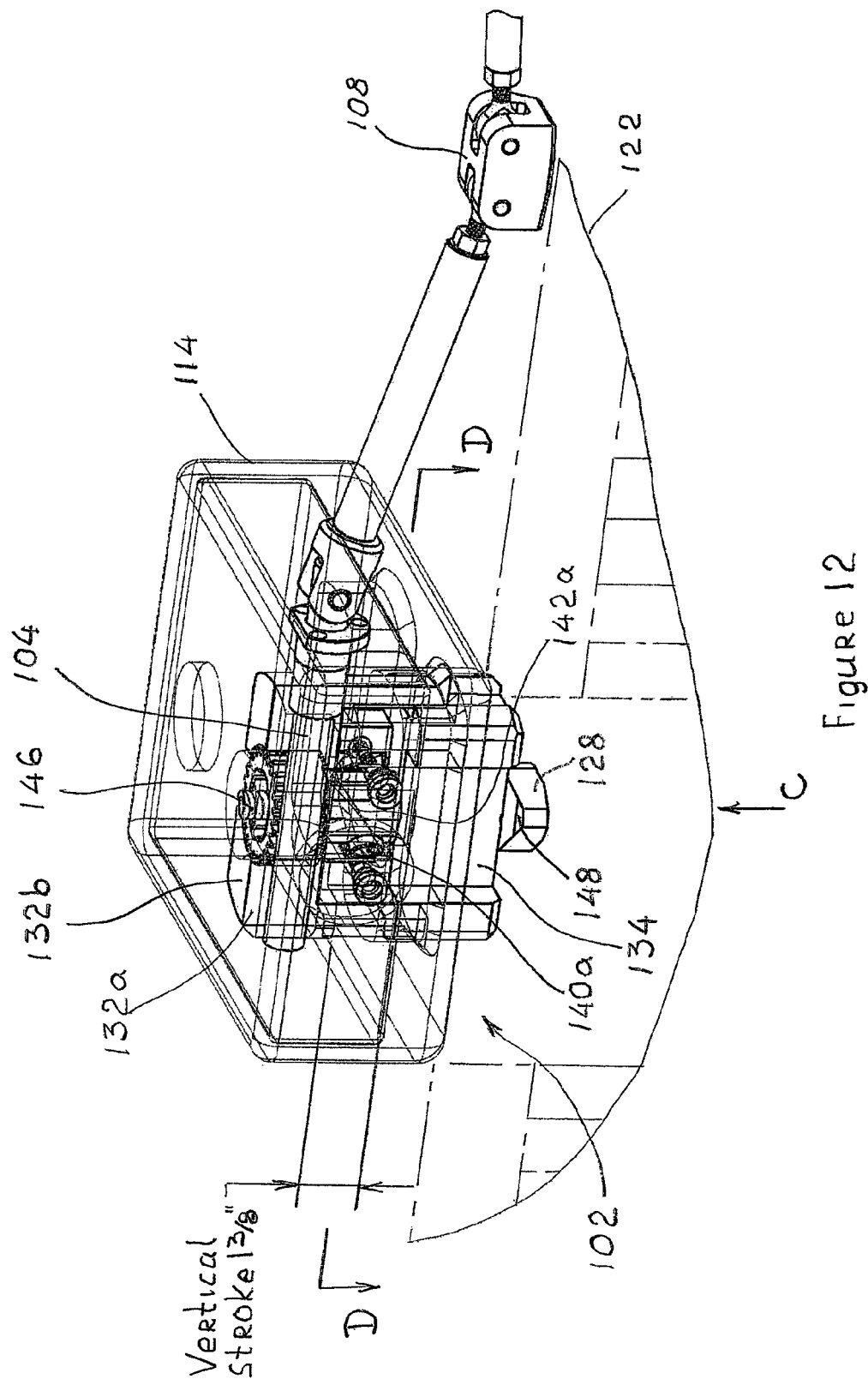
FIG. 12 is a view showing the orientation of the components of the automatic lock of the present invention when the upper cargo container has been landed.
Figure 13:
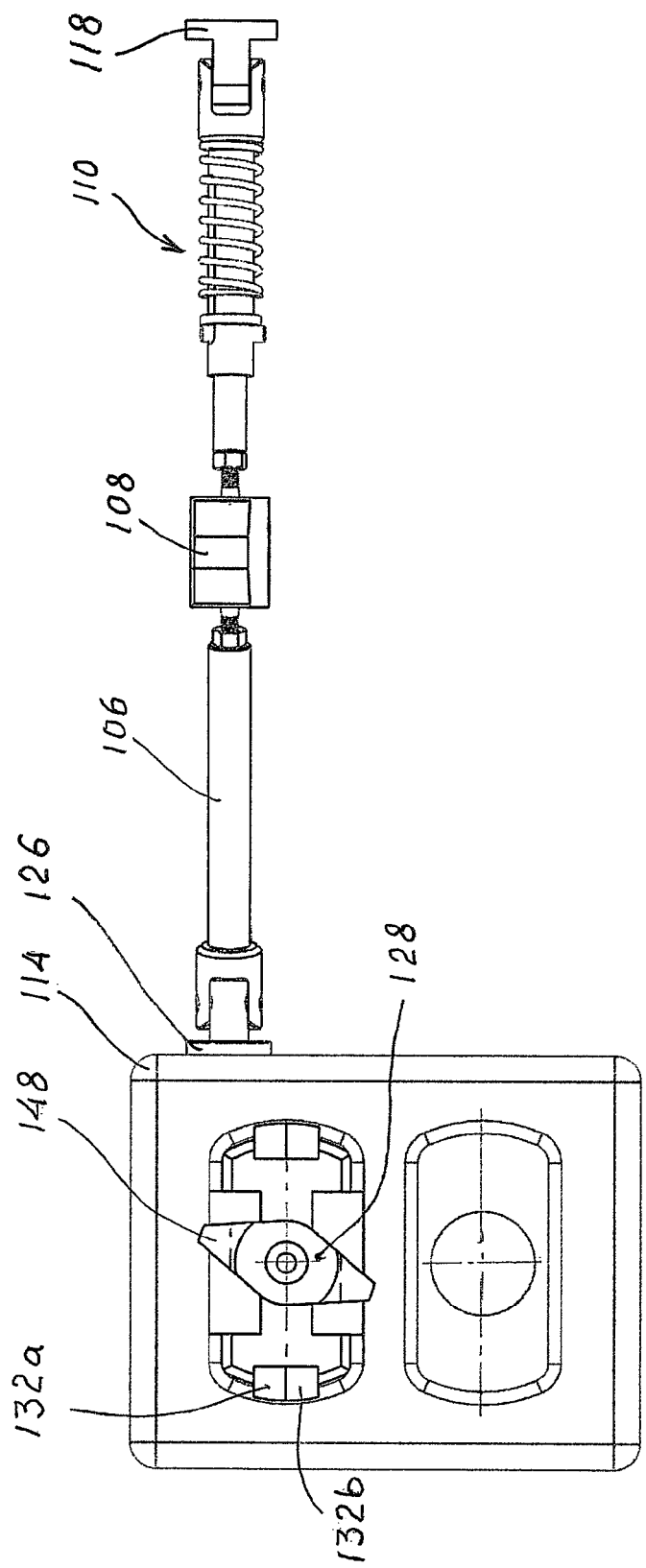
FIG. 13 is a view taken along arrow C of FIG. 12.

Referring now to FIG. 12, mechanism 102 further includes a vertical spring 146. Spring 146, which functions to urge cam followers 140*a*, 140*b* into engagement with cam surfaces 142*a*, 142*b*, will be described further hereinbelow. In one preferred embodiment, the vertical stroke of slider 134 is approximately 1⅜ inches. The orientation of lower cone 128 when in the fully rotated position is shown in FIG. 13. As mentioned hereinabove, lower cone 128 rotates through approximately 61 degrees of rotation as it translates downward to penetrate the corner fitting in the lower container. As shown, once inside the corner fitting of the lower container, lower cone 128 continues rotating counterclockwise (as viewed in FIG. 13) approximately 15° such that bearing area 148 engages the corner fitting of the lower container. In one preferred embodiment, bearing area 148 provides the minimal bearing contact area of 400 mm². Depending on the size and configuration of lower cone 128, more or less rotation may be required to obtain the minimum bearing contact area. Is also contemplated herein that bearing area 148 may be configured to facilitate release of the lower cone from the lower corner fitting during unloading of the upper container. More particularly, bearing area 148 may be formed with a cross-sectional configuration which tends to rotate lower cone 128 in the clockwise direction (as viewed in FIG. 13) in the event that hoisting of the upper container causes lower cone 128 to contact the inner surface of the lower corner fitting.

Figure 14:
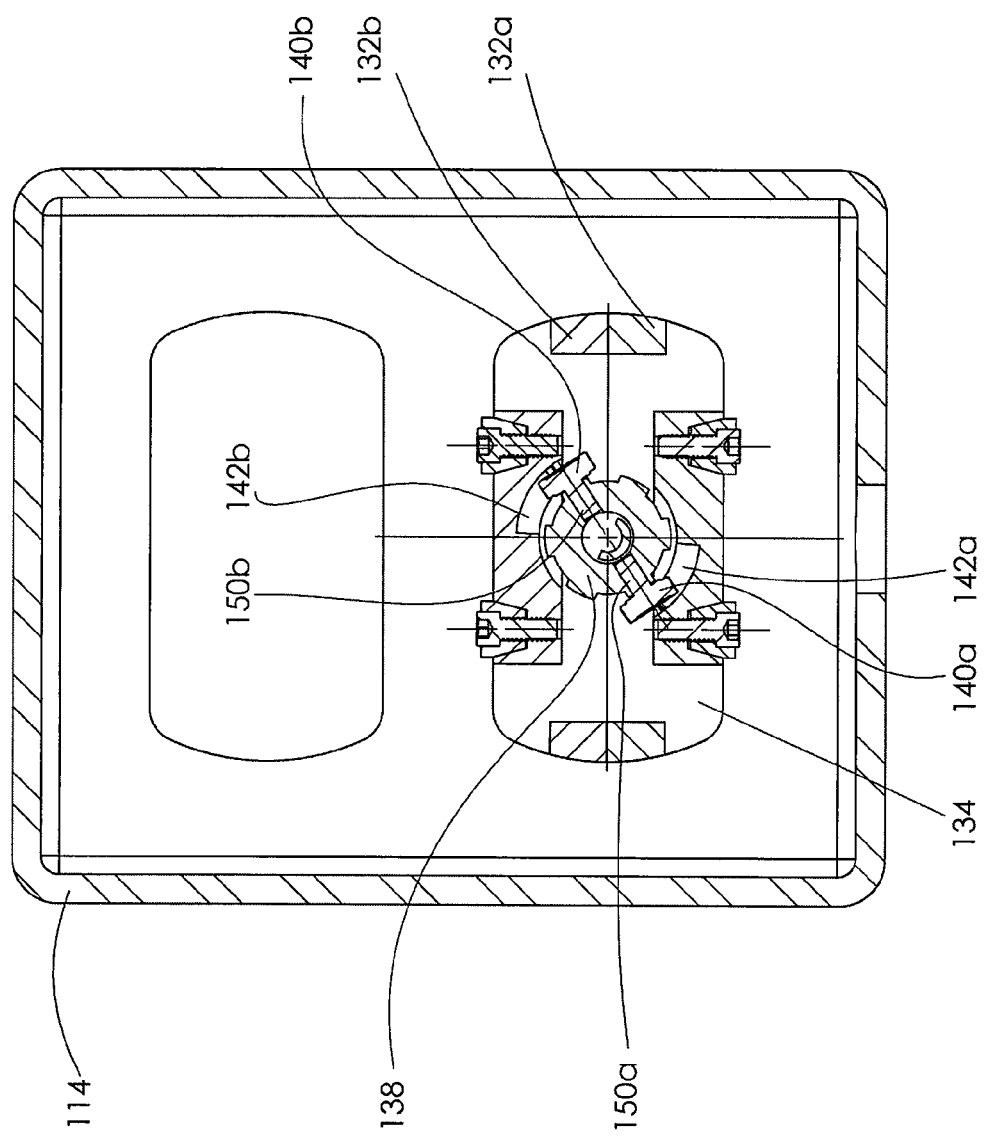
FIG. 14 is a cross-sectional view taken along lines D-D of FIG. 12.
Figure 15:
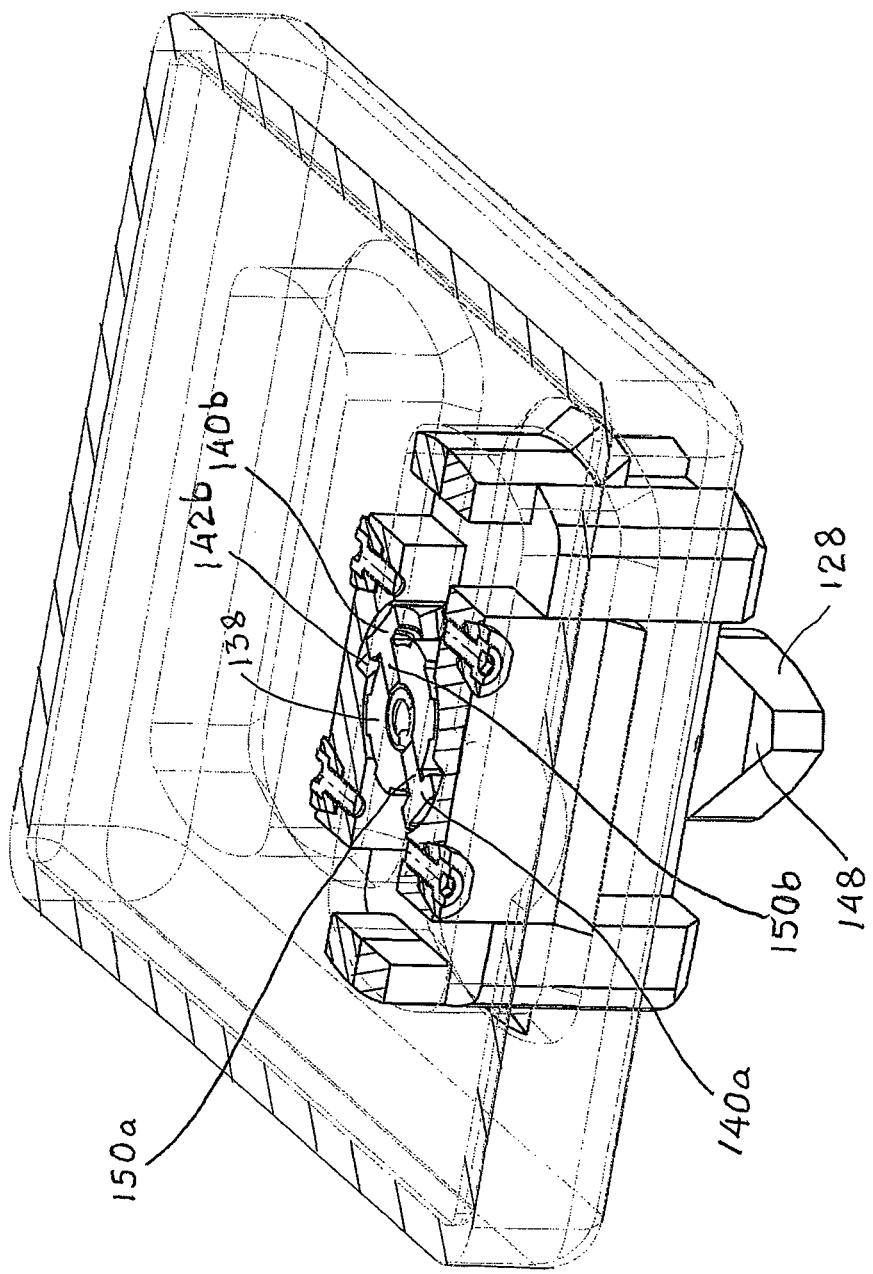
FIG. 15 is a detail of the cam/cam follower arrangement of the automatic lock of the present invention.
Figure 16:
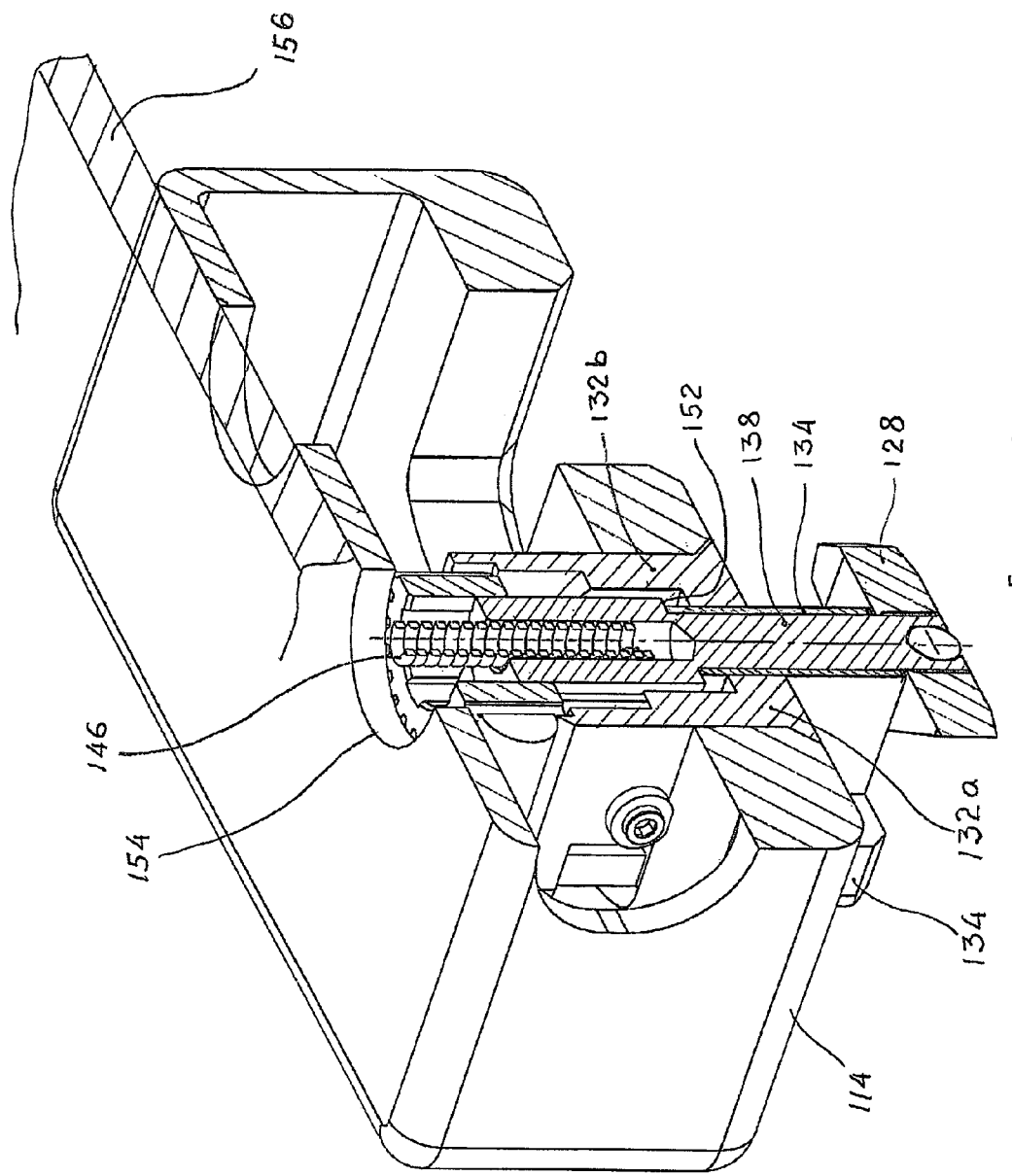
FIG. 16 is a sectional view taken through the corner fitting mechanism of the automatic lock of the present invention.

Cam surfaces 142*a*, 142*b* and cam followers 140*a*, 140*b* will be explained in greater detail with reference to FIGS. 14-16. Turning first to FIG. 14, cam followers 140*a*, 140*b* are rotatably connected to spline shaft 138 via shafts 150*a*, 150*b*, respectively. As best seen in FIG. 15, as spline shaft 138 rotates clockwise, cam follower 140*b* will travel along cam surface 142*b*. Simultaneously, cam follower 140*a* will travel along cam surface 142*a*. Referring now to FIG. 16, one end of vertical spring 146 extends within spline shaft 138, while the other end extends upward to contact the interior floor of the upper container. More particularly, spring 146 is arranged to contact a fixed surface of the upper cargo container such that spring 146 maintains a downward biasing force against shaft 138. This downward biasing force will ensure that the cam followers remain in contact with the cam surfaces as spline shaft 138 is rotated. As best seen in FIG. 16, shaft 138 includes a shoulder 152. Slider 134 is accordingly captured between shoulder 152 and lower cone 128. As a result, vertical displacement of spline shaft 138 causes simultaneous vertical displacement of slider 134. Spline shaft 138 is also free to rotate with respect to slider 134 as it is vertically displaced. Due to the size limitations of the corner fitting, a portion of spline shaft 138 preferably extends above the height of gear 136 (see FIG. 10), such portion extending into opening 154 of the corner fitting shown in FIG. 16. As a result, vertical spring 146 is preselected to have a length which extends through this same opening and contacts interior floor 156 of the container. Of course, is contemplated herein that vertical spring 146 could be configured to contact another fixed area of the corner fitting and/or upper cargo container.

Figure 17:
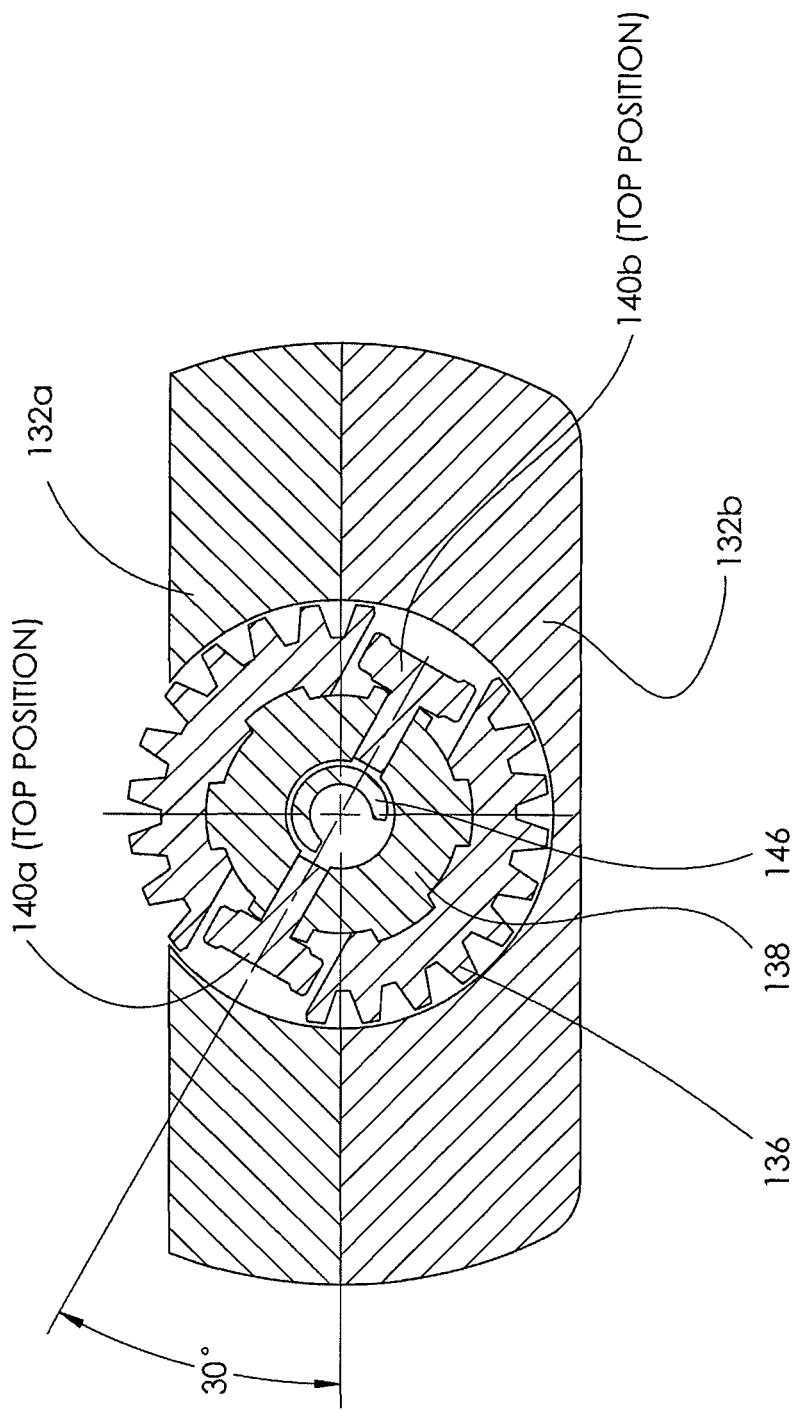
FIG. 17 is a schematical top view of the cam/cam follower arrangement of the automatic lock of the present invention.
Figure 18:
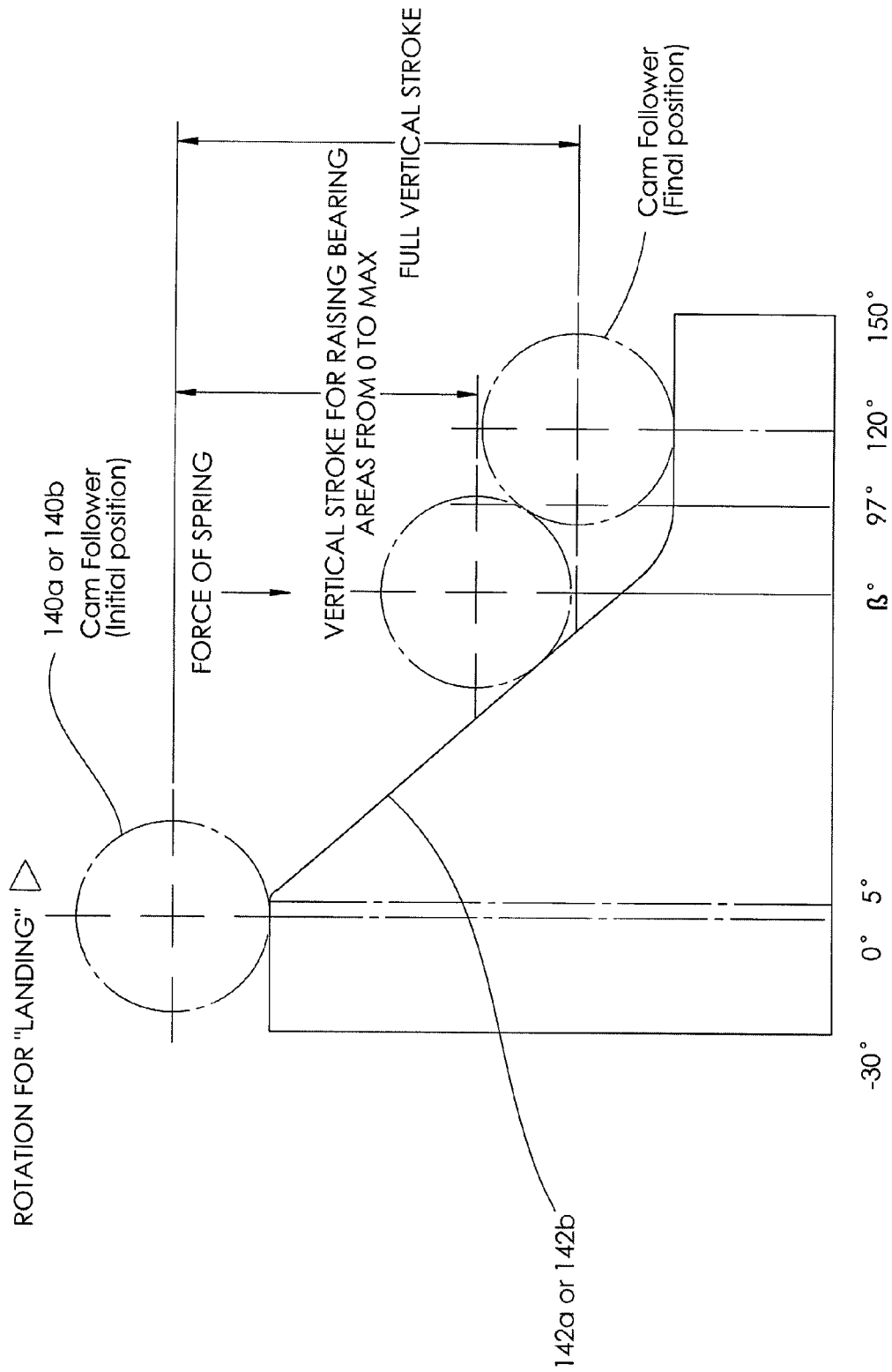
FIG. 18 is a flat pattern of the cam's profile and cam follower position, synchronized in time.

FIGS. 17-18 provide further details regarding the cam/cam follower arrangement of the present invention. FIG. 17 provides a schematical cross-sectional view showing the connection of the cam followers to the spline shaft, as well as the front and rear cam surfaces. FIG. 18 is a flat pattern of the cam's profile, together with the cam follower position, synchronized in time. The front and rear patterns are substantially identical. At 0° (i.e., the initial position), the slider is an upper position. Vertical spring 146 is fully compressed between interior floor 156 and the contact surface within the spline shaft. The force exerted by spring 146 forces each of the cam followers into contact with their respective cam surfaces. At this point, foot 108 begins to contact a surface therebelow, e.g., the upper surface of a lower domestic container. From 0° to 5°, the upper domestic container is lowered downward. This in turn causes generally upward displacement of foot 108, which in turn causes movement of the rack (to the left is viewed in FIG. 12), and in turn rotation of gear 136. During this first 5° of rotation, downward translation of slider 134 is preferably restricted. The restriction of downward movement of slider 134 during this first 5° of rotation limits/eliminates unwanted movement of the cam followers due to vibrations/forces encountered at the initiation of landing, e.g., forces generated by the initial compression of spring-loaded linkage 110. From 5° to an angle β=61°, the slider moves down, and the lower cone rotates in the clockwise direction (as viewed from above). Once angle has been reached, lower cone 128 has penetrated the opening in the lower corner fitting and is positioned for locking rotation. During the same time, foot 108 has been translated upward, and spring-loaded linkage 110 has been compressed. The 61° angle mentioned above corresponds to the 61° angle discussed with reference to FIG. 11. Depending on the configuration and design, this 61° angle may be increased or decreased. From angle β to 97°, the landing of the upper cargo container continues. During this time, the slider is in its lowest position, and lower cone 128 continues to rotate. From 97° to 120°, the lower cone rotates to its locked position, i.e., to provide the required bearing surface contact area. At 120°, the landing of the upper cargo container has been accomplished.

Figure 19:
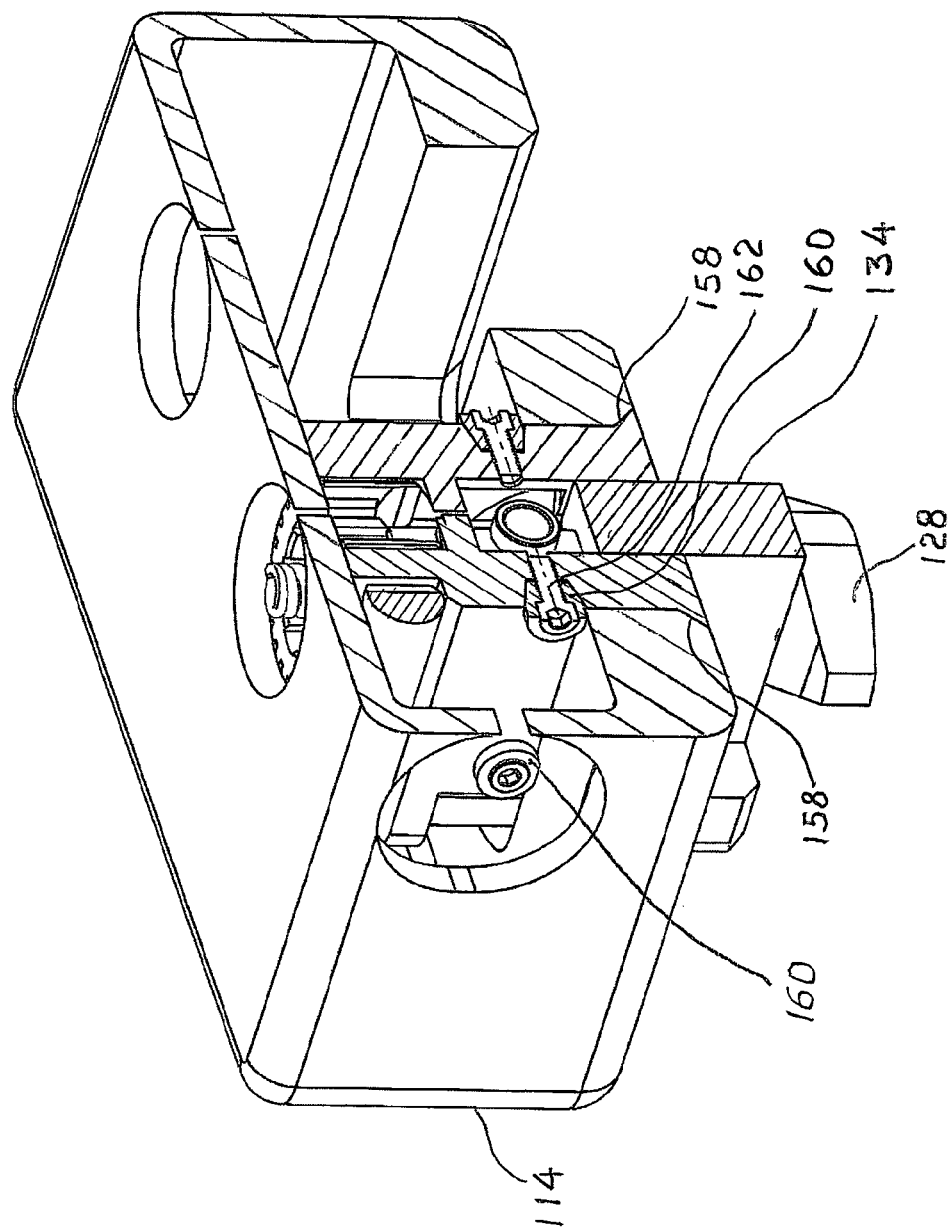
FIG. 19 is another sectional view taken through the corner fitting mechanism of the automatic lock of the present invention.

Referring now to FIG. 19, and as mentioned hereinabove, body 132 is formed with a plurality of skirts 144 about its lower edges (see FIG. 10). Skirts 144 interact with chamfered edges 158 of the opening in the corner fitting. As such, mechanism 102 can be inserted into the opening until skirts 144 contact chamfered edges 158. It will be appreciated that this contact occurs on all four sides of mechanism 102, thus limiting any movement of mechanism 102 with respect to the corner fitting, other than downward vertical movement. To secure mechanism 102 within the corner fitting, a plurality of wedges 160 are employed. As shown, two wedges are attached on each side of mechanism 102 via clamping screws 162. Wedges 160 are preferably formed with a conical shape such that tightening of screw 162 forces the individual wedge into greater contact with the interior surface of the corner fitting, thus urging mechanism 102 vertically upward, while at the same time fixedly securing mechanism 102 therein.

Figure 20:
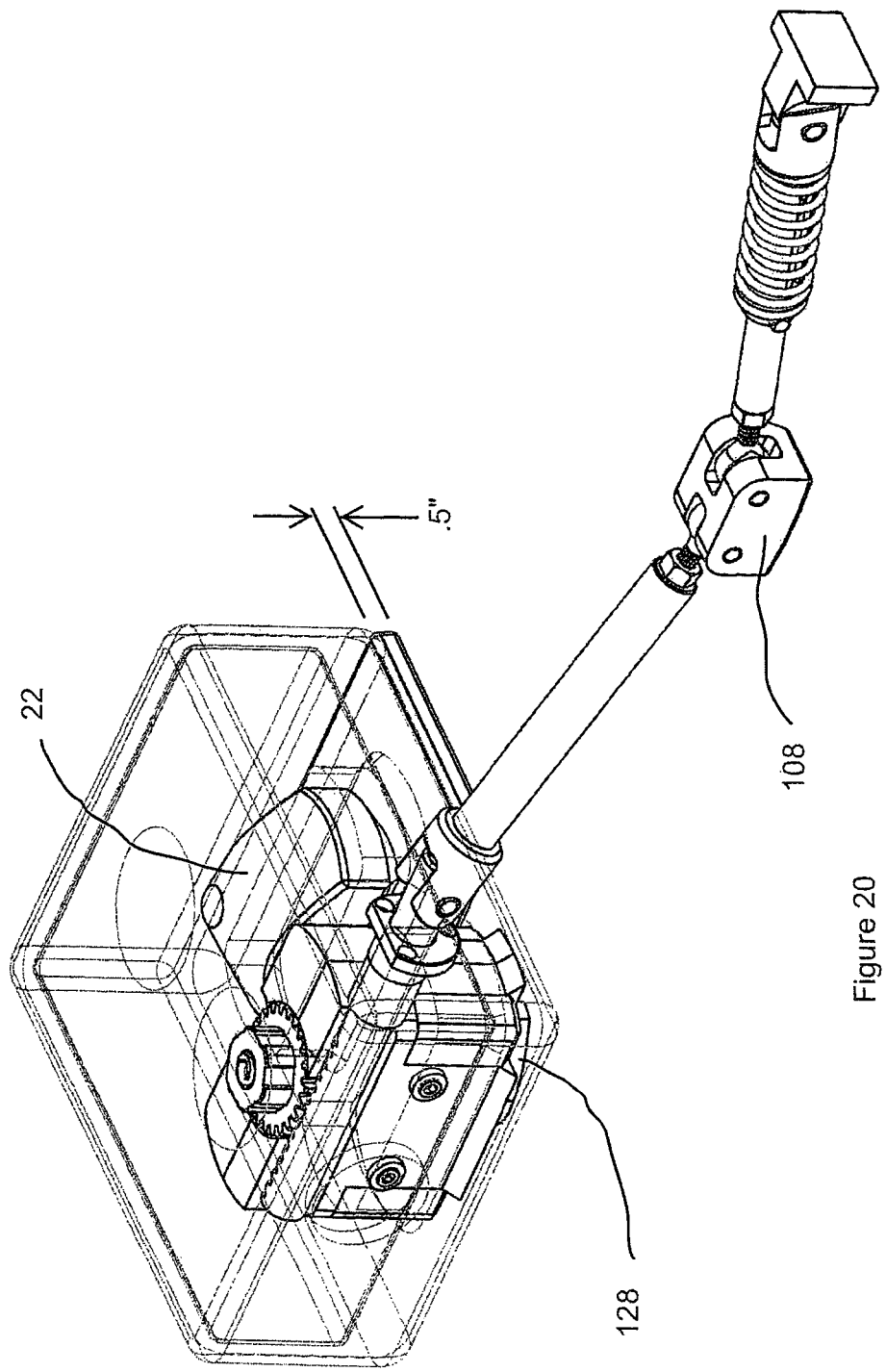
FIG. 20 is a schematical view showing the interaction of one corner fitting of a domestic cargo container incorporating the automatic lock of the present invention with a retainer positioned on the floor of a well car.

FIG. 20 shows a corner fitting of a domestic container containing the automatic lock of the present invention interacting with a retainer positioned on the floor of a well-car. As discussed hereinabove, the retainers located on the floor of the well-car penetrate and engage the inboard openings of the lower corner fittings. Plate 164, which supports retainer 22, typically has a thickness of approximately ½ inch. In one preferred embodiment, lower cone 128 is designed to extend approximately ½ inch below the surface of the corner fitting. As a result, the cargo container will rest upon plates 164, and not upon lower cone 128.

It is contemplated herein that a domestic container containing the automatic lock of the present invention may be landed on the ground. In this situation, the weight of the container will rest upon the four lower cones protruding from the lower corner fittings. The novel design of the current automatic lock ensures that the mechanism fitted within each corner fitting can support the weight of the container. In addition to the domestic containers described hereinabove, it is contemplated herein that the automatic lock of the present invention may be utilized with other standard containers used in the different forms of cargo transportation.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. An automatic lock for a cargo container, said container having an upper surface and a lower surface, said container further including at least one lower corner fitting located on said lower surface thereof, comprising:
    a corner fitting mechanism sized and configured for location within an opening formed in said lower corner fitting, said mechanism including a lower cone sized and located to releasably engage an adjacent corner fitting when said container is stacked upon another cargo container, said mechanism further including a housing body, a gear and a spline shaft; and
    wherein said housing body supports said gear, said spline shaft engaging a surface of said gear whereby rotation of said gear causes simultaneous rotation of said spline shaft, said spline shaft engaging said lower cone whereby rotation of said spline shaft causes simultaneous rotation of said lower cone.

2. The lock according to claim 1, wherein said corner fitting mechanism further includes a pair of cam followers and a vertical spring, and wherein said housing body includes opposing cam surfaces; and wherein said vertical spring causes said cam followers to follow said cam surfaces as said spline shaft is rotated whereby said spline shaft is simultaneously vertically displaced upon rotation thereof by said gear.

3. The lock according to claim 2, wherein said corner fitting mechanism further includes a slider, said slider cooperating with said spline shaft whereby vertical displacement of said spline shaft causes simultaneous vertical displacement of said slider; and
    wherein said spline shaft rotatably extends through said slider.

4. The lock according to claim 3, wherein said lower corner fitting includes both an inboard opening and an outboard opening; and
    wherein said corner fitting mechanism is located in said outboard opening of said lower corner fitting.

5. The lock according to claim 4, wherein said housing body includes a plurality of skirts configured to engage the circumference of the opening of said outboard opening of said lower corner fitting.

6. The lock according to claim 5, further comprising a plurality of wedges for securing said corner fitting mechanism within said outboard opening of said lower corner fitting.

7. The lock according to claim 6, wherein said wedges are formed with a conical shape.

8. The lock according to claim 6, wherein said lower cone extends approximately ½ inch below a lower surface of said lower corner fitting.

9. The lock according to claim 3, wherein said lower cone is initially positioned at an orientation which allows rotation of approximately 61 degrees between the initiation of vertical displacement of said spline shaft until entry of said lower cone into said adjacent corner fitting.

10. The lock according to claim 9, wherein said lower cone is configured to be rotated an additional approximately 15 degrees after entry into said adjacent corner fitting.

* * * * *